United States Patent [19]

Stjern et al.

[11] Patent Number: 4,653,918

[45] Date of Patent: Mar. 31, 1987

[54] LOW Q BODY-DITHERED LASER GYRO ASSEMBLY

[75] Inventors: Daryl C. Stjern, Thousand Oaks; Thomas M. Wirt, Canoga Park, both of Calif.

[73] Assignee: Sundstrand Corporation, Rockford, Ill.

[21] Appl. No.: 496,606

[22] Filed: May 20, 1983

Related U.S. Application Data

[63] Continuation-in-part of Ser. No. 485,731, Apr. 18, 1983, abandoned.

[51] Int. Cl.$^4$ .............................................. G01C 19/64
[52] U.S. Cl. ...................................................... 356/350
[58] Field of Search .......................... 356/350; 372/94; 310/317, 323

[56] References Cited
FOREIGN PATENT DOCUMENTS 0069365 1/1983 European Pat. Off. ............ 356/350

OTHER PUBLICATIONS

Scale Factor Non-Linearity of a Body Dither Laser Gyro, T. J. Hutchings and D. C. Stjern, 1978.

*Primary Examiner*—Davis L. Willis
*Assistant Examiner*—S. A. Turner
*Attorney, Agent, or Firm*—Wood, Dalton, Phillips, Mason & Rowe

[57] ABSTRACT

A low Q ring laser gyro-dither motor assembly which is responsive to a wide range of frequency components of a drive signal having a randomly varying frequency such that the dither imparted to the gyro is frequency modulated by the drive. The frequency modulated dither varies the lock-in rate of the gyro as a function of the random drive signal to eliminate errors in the gyro output due to lock-in. The drive signal may be random in frequency only or random in both frequency and amplitude to provide the frequency modulation. Fixed frequency modulation may also be employed. The low Q assembly need not be driven at the natural frequency thereof so that a common drive circuit may be employed for a plurality of low Q gyro-dither motor assemblies forming an instrument cluster.

26 Claims, 11 Drawing Figures

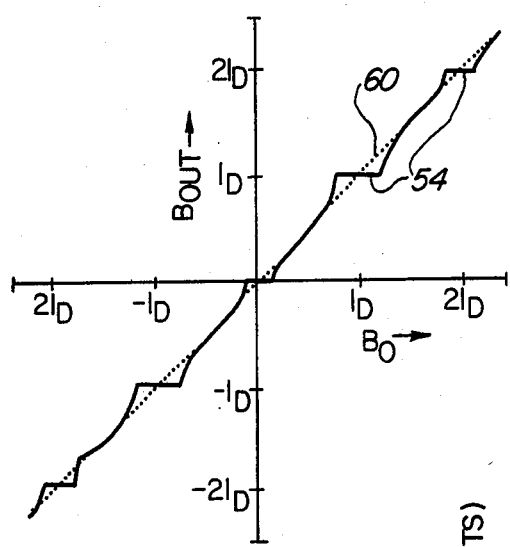
FIG. 5
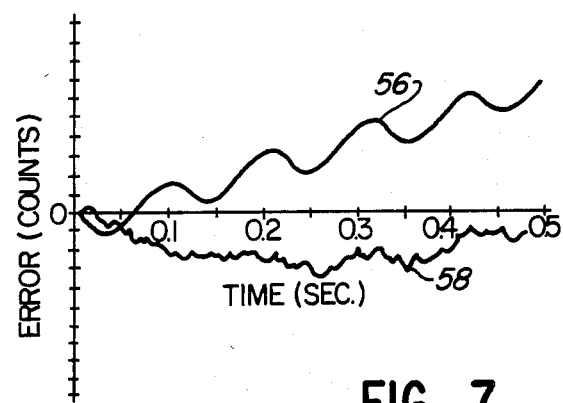
FIG. 7
FIG. 6
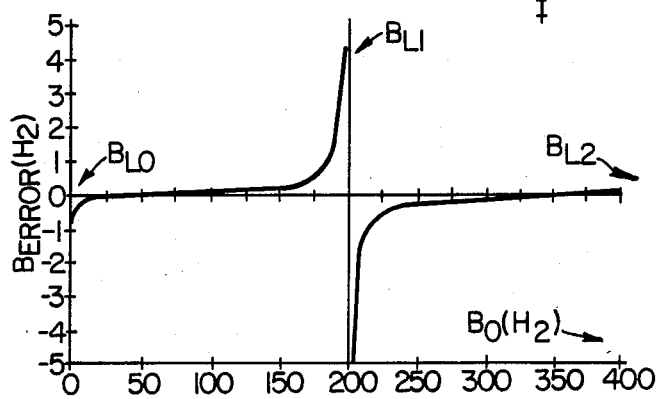
FIG. 11
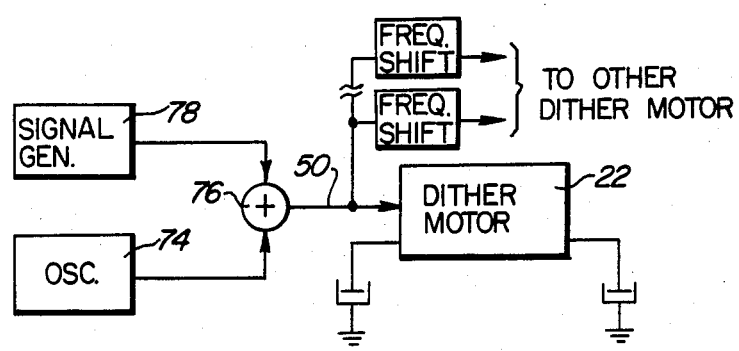

FIG. 8
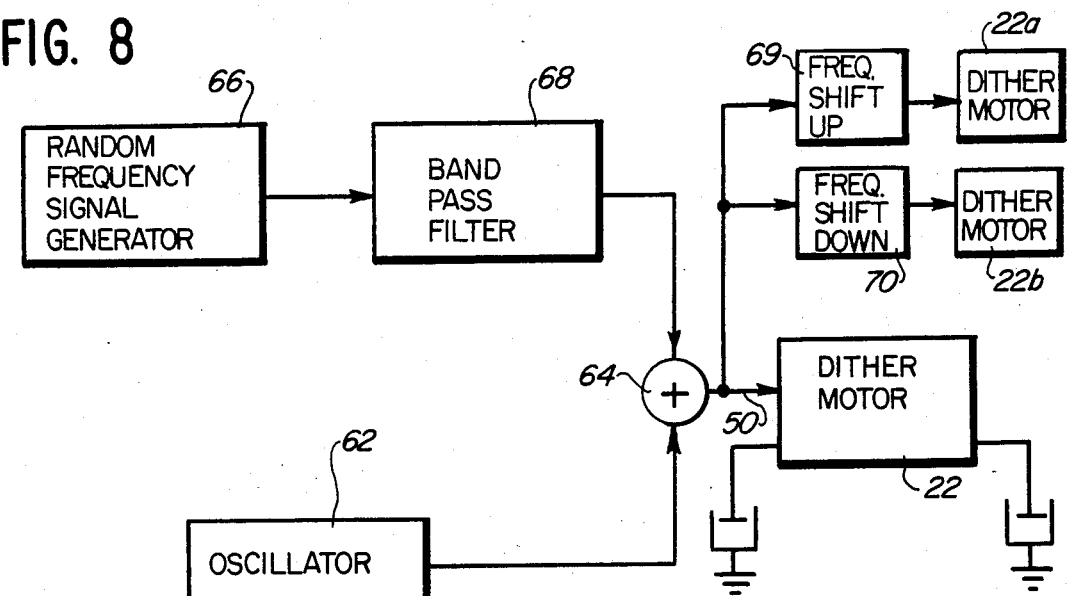
FIG. 9
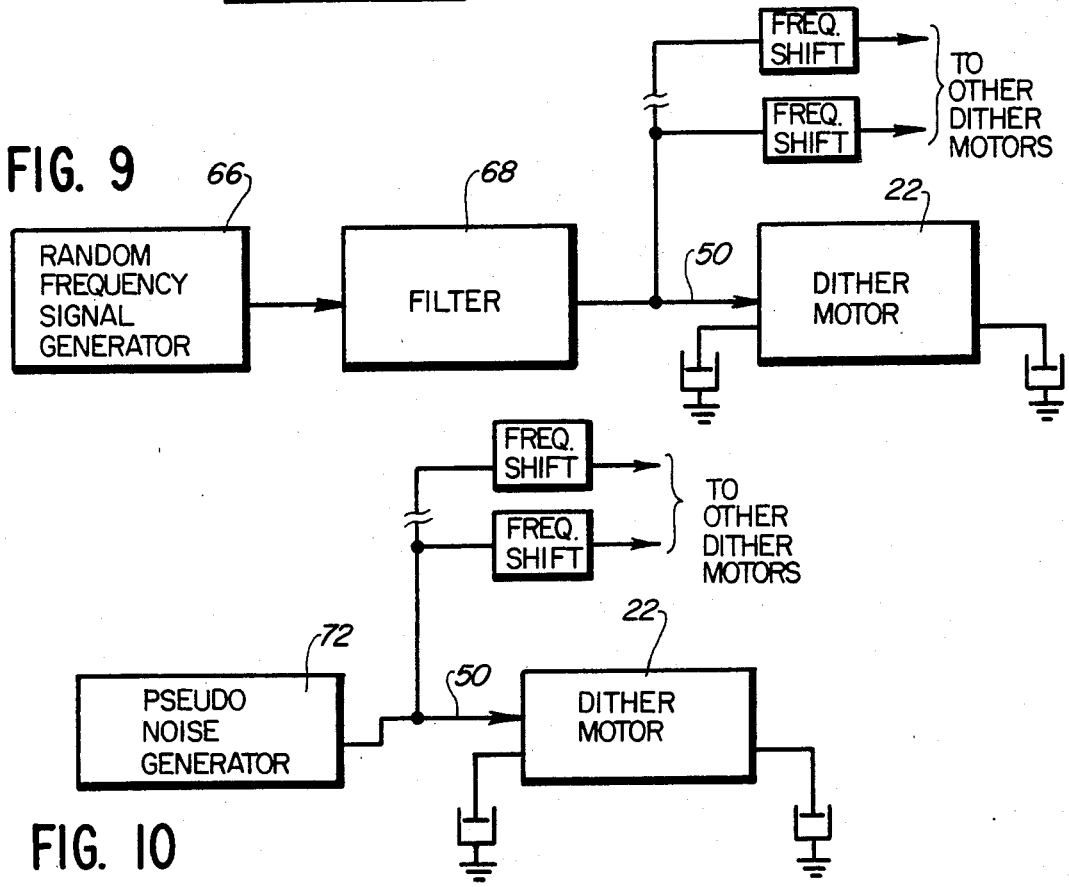
FIG. 10

LOW Q BODY-DITHERED LASER GYRO ASSEMBLY

This application is a continuation-in-part of application Ser. No. 485,731 filed Apr. 18, 1983, now abandoned.

TECHNICAL FIELD

The present invention relates to ring laser gyros and more particularly to an apparatus for eliminating errors in the output of the gyro due to "lock-in".

BACKGROUND ART

In a laser gyro, two monochromatic beams of light are generated and caused to travel in opposite directions about a closed loop path perpendicular to the axis about which rotation is to be sensed. As the gyro is rotated, the effective path length for one beam is increased while the effective path length for the other beam is decreased. Because the frequency of oscillation of a laser is dependent upon the length of the lasing path, a frequency difference between the two beams is produced. The magnitude and sign of this frequency difference is indicative of the rate and direction of rotation of the gyro about its sensitive axis and may be monitored to provide the desired gyro output.

As the rate of rotation being sensed is decreased, the frequency difference between the two beams is similarly decreased. At very low rates of rotation, errors arise due to "lock-in" effects, whereby no frequency difference between the beams is observed. Lock-in arises where the frequency splitting between the two beams is small, causing coupling from one beam into the other beam so that the beams oscillate at the same frequency. This results in a dead band or lock-in region wherein the gyro output does not track the input.

Various dither techniques have been employed in an attempt to eliminate lock-in at low rates of rotation. One such technique is to provide a dither motor to vibrate the body of the gyro with a sinusoidal dither at the natural frequency of the assembly as shown in Killpatrick Pat. No. 3,373,650. Another technique employed to minimize the effects of lock-in at low rates of rotation is shown in Killpatrick Pat. No. 3,467,472 which provides the addition of a random noise input to the sinusoidal drive signal for a gyro-dither motor assembly such as shown in Killpatrick Pat. No. 3,373,650. Each of the gyro-dither motor assemblies shown in the Killpatrick patents is a high Q assembly so that it may be driven at its natural frequency.

A rigorous analysis of the effects of a sinusoidal body dither and a sinusoidal body dither having a random noise input for a laser gyro as shown in the Killpatrick patents, is given in the article entitled "Scale Factor Nonlinearity of a Body Dither Laser Gyro" by Thomas J. Hutchings and Daryl C. Stjern (1978). This article shows that with a sinusoidal body dither, there are significant scale factor errors or nonlinearities in the output of the gyro, not only at very low input rates, but also at input rates which are a harmonic of the sinusoidal dither frequency. The article also shows that with the addition of a random noise input signal to the sinusoidal body dither, the scale factor errors or nonlinearities which result when the input rate is a harmonic of the dither frequency are somewhat reduced, but not eliminated. The body dithered laser gyro used to illustrate these effects, like all known prior art body dithered laser gyros, was an assembly having a high Q.

Known body dithered laser gyros have specifically been made to have a relatively high Q, i.e., a Q of 100 or more, because very little power is required to drive the dither motor supporting the gyro when it is driven at the natural frequency of the assembly. However, the effect of such a high Q assembly is that while a random noise input signal may be added to the sinusoidal drive for the dither motor, the assembly responds only to those noise frequency components of the drive signal which are at or very close to the natural frequency of the assembly. As a result, the body dither actually obtained with such a high Q assembly appears to be a sinusoidal dither with a small amount of amplitude modulation as a result of the frequency components in the random noise input which are close to the natural frequency of the assembly. Noise frequency components which are much different in frequency will have a negligible effect on the actual dither achieved, there being no frequency modulation of the dither motion. The small amount of amplitude modulation of the sinusoidal dither may result in a reduction in the width of the nonlinearities caused when the input rate of the gyro is a harmonic of the dither frequency, but does not completely eliminate the nonlinearities.

Further, with a high Q gyro-dither motor assembly, the amplitude of vibration imparted to the gyro is affected by other factors such as external vibratory inputs. Thus, such high Q assemblies require the use of feedback circuits to drive the gyro-dither motor at the natural frequency of the assembly in order to maintain the desired amplitude. Where laser gyros are employed in an instrument cluster, each of the gyros must have its own feedback circuit to which its associated dither motor is responsive.

In an instrument cluster having three gyro-dither motor assemblies each being positioned on a different one of the X, Y and Z axes, it has also been found that when the gyros are driven at the same frequency, they tend to beat together. This causes the instrument cluster to move in a manner which defines a cone, this motion resulting in so-called coning errors. In order to prevent coning errors from arising, each of the gyros forming the instrument cluster must be driven at a different frequency. Where the instrument cluster is comprised of three high Q gyro-dither motor assemblies, the structure of each assembly must be made different, so that each assembly has a different natural frequency at which it is driven. The high Q gyro-dither motor assemblies of such an instrument cluster are therefore not interchangeable. That is, an X-axis assembly cannot be used to replace a Y-axis assembly. This results in the need to maintain a large inventory of the three different types of gyro-dither motor assemblies.

DISCLOSURE OF THE INVENTION

In accordance with the present invention the disadvantages of prior body-dithered laser gyros as discussed above have been overcome. The gyro-dither motor of the present invention forms an assembly which is made to be responsive to a wide range of frequency components. The dither motion imparted to the gyro is frequency modulated to randomly vary the lock-in rate of the gyro such that nonlinearities or errors in the gyro output due to lock-in are eliminated.

The gyro-dither motor assembly is specifically made having a low Q so as to be responsive to a wide range of frequency components of the dither motor drive signal, the dither motion imparted to the gyro being frequency modulated by the drive signal to eliminate nonlinearities in the gyro output due to lock-in. The gyro-dither motor assembly is made having a low Q by damping the natural frequency of the assembly, the damping being achieved electrically or mechanically.

The frequency modulation of the dither motion for the low Q gyro-dither motor assembly may be accomplished with a drive signal which is random in frequency only, or which is random in both frequency and amplitude. Fixed frequency modulation may also be employed.

Because the gyro-dither motor assembly need not be operated at its natural frequency, the circuit for generating the drive signal for the dither motor is simplified in that feedback is not required.

Further, when a plurality of low Q gyro-dither motor assemblies are employed in an instrument cluster, a common drive to which each assembly is responsive is employed. In order to prevent coning errors each assembly is driven at a different frequency by frequency shifting the drive. Although each of the gyro-dither motor assemblies is driven at a different frequency, because each of the assemblies is low Q and need not be driven at its natural frequency, the assemblies forming the cluster may have the same structure and the same natural frequency. Therefore, the low Q gyro-dither motor assembly associated with one axis is completely interchangeable with the assemblies associated with the other axes and an inventory of only one type of low Q assembly need be maintained.

BRIEF DESCRIPTION OF THE DRAWINGS

FIG. 5 is a graph illustrating the problem of lock-in and its solution in accordance with the present invention;

FIG. 6 is a graph illustrating the lock-bands associated with a high Q, sine wave body dithered laser gyro;

FIG. 7 is a graph illustrating the integrated error of the gyro output as a function of time for a high Q gyro dither-motor assembly having a sinusoidal drive and a sinusoidal drive with a random noise input;

FIG. 8 is a block diagram illustrating the drive circuit comprising a sine wave oscillator and a random frequency signal generator for a plurality of dither motors;

FIG. 9 is a block diagram illustrating an alternate drive circuit comprising a random frequency signal generator;

FIG. 10 is a block diagram illustrating a still further alternate drive circuit comprising a pseudo-noise generator;

FIG. 11 is a block diagram illustrating a drive circuit for fixed frequency modulation.

BEST MODE FOR CARRYING OUT THE INVENTION

Figure 1:
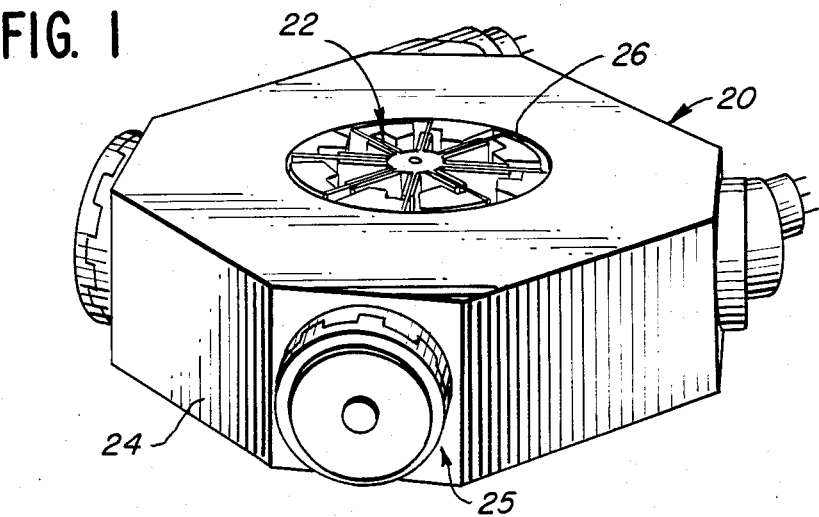
FIG. 1 is a perspective view of a typical laser gyro mounted on a dither motor in accordance with the present invention.

FIG. 1 shows a perspective view of a typical ring laser gyro 20 mounted on the dither motor 22 of the present invention. The case or body 24 of the laser gyro 20 is approximately square in shape with truncated corners on which mirror assemblies 25 are attached, the mirrors reflecting two counter-rotating beams of monochromatic light about a closed loop path disposed within the body of the gyro. The body 24 has an inner diameter defining a centrally located cylindrical opening 26 within which the dither motor 22 mounts. The axis of the opening 26 is the sensitive axis of the laser gyro about which the instrument measures angular motion.

Figure 2:
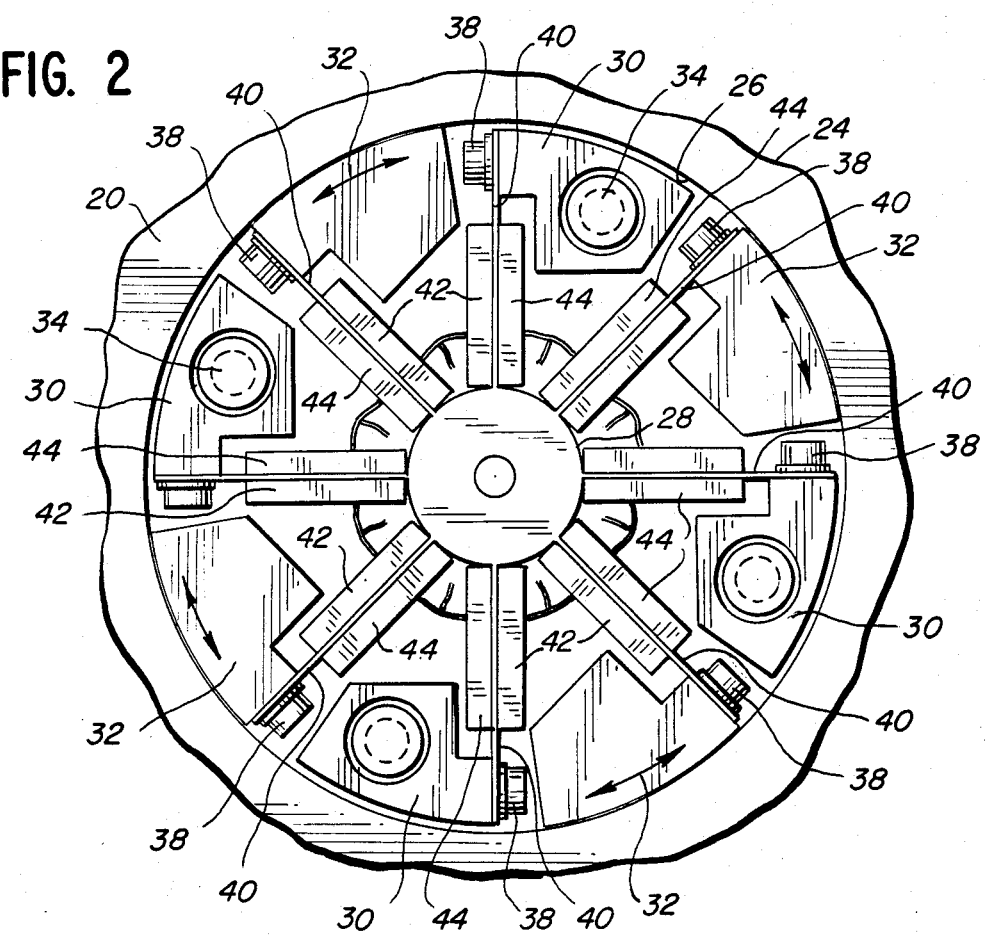
FIG. 2 is a top view, taken on an expanded scale, of the dither motor of FIG. 1.

Referring to FIG. 2, a top view of a portion of the instrument of FIG. 1 particularly illustrating the dither motor 22 may be seen. The dither motor 22 includes a central hub 28 having eight radial spoke-like assemblies extending therefrom and coupled, at their outer ends, to segments 30 and 32. Segments 30 and 32 are similar in configuration; however, segments 32 are bonded to the body 24 of the laser gyro 20 whereas segments 30 are fastened by mounting screws 34 to a mounting plate 36 disposed thereunder. This general arrangement may also be seen in FIG. 4 which illustrates the laser gyro schematically in cross section, and provides a side view of the dither motor. As may be seen therein, screws 34 are coupled to a mounting plate or surface 36 typical of substantially all laser gyro applications (laser gyros are generally used in a strap down mode, and accordingly, the dither motor mount thereof, normally bolts directly to the vehicle, i.e., is not gimbaled with respect thereto).

Fastened to the segments 30 and 32 by the screws 38 are flat spring members 40 which extend radially outward from the central hub 28. The central hub 28 as well as segments 32 and spring members 40 terminate at a position slightly above the mounting surface 36 (see FIG. 4) and preferably slightly above the base plane of the laser gyro. Further, as may be seen in FIG. 2, segments 30 are proportioned and positioned so as to be slightly radially inward with respect to the inner surface 26 of the gyro body. Thus, with this arrangement, segments 30 will remain stationary with respect to the mounting surface 36, though the instrument itself may vibrate about the axis of the support.

Figure 3:
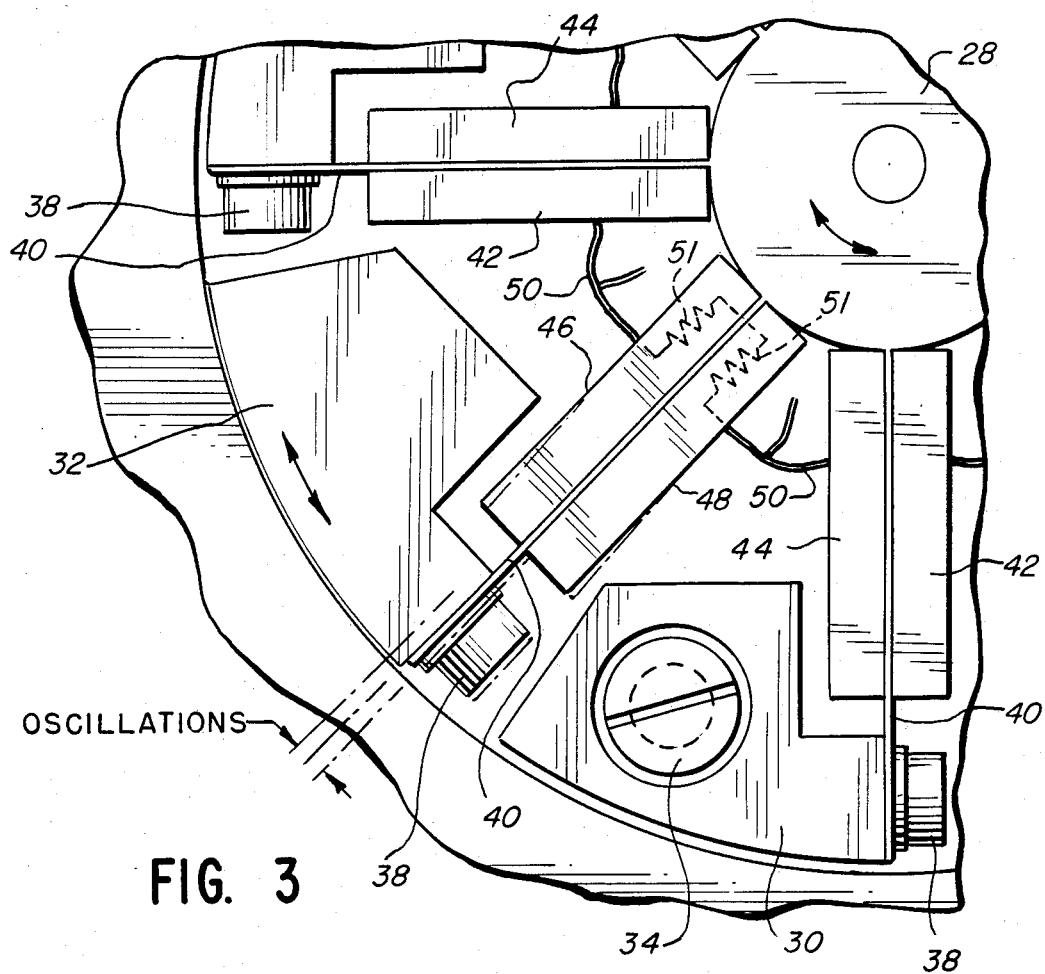
FIG. 3 is a top view, taken on a further expanded scale, of a portion of the dither motor of FIG. 2 illustrating the manner of dither thereof.

As may be seen in FIGS. 2 and 3, piezoelectric crystals 42 and 44 are bonded to opposite sides of the spring members 40, preferably using a conductive cement. Thus, the spring members 40 will provide one electrical contact for each of the piezoelectric members 42 and 44. Each of the piezoelectric members are piezoelectric crystal members oriented for electrical contact on the face bonded to a respective one of the spring members 40 and on the opposite faces 46 and 48 thereof. The piezoelectric members are pieces of piezoelectric material cut and finished to the desired geometric shape with the desired orientation with respect to the crystallographic axes of the material so that the crystal will respond to an applied electric field with the desired strain and deflection. In the present invention, the piezoelectric members 42 have a crystal orientation such that an electric field applied between the surface 46 and the surface abutting the spring members 40 will cause the crystal to deflect as shown in FIG. 3. The static deflection and direction are dependent upon the amplitude and polarity of the applied field. Since the surfaces 46 and 48 of the crystals 42 and 44, respectively, are electrically coupled together in parallel through the line connections 50, it may readily be seen that the piezoelectric members 44 must be of a different cut than the crystals 42, as the strain of the crystals 44 should be complimentary to the strain of the crystals 42 when the voltage applied to the crystals 44 is opposite the voltage applied to the crystals 42. This particular crystal orientation then allows a single voltage to be applied between the common connection of lines 50 and the dither motor ground to drive all of the piezoelectric elements in parallel and in a complementary manner.

It will be noted from FIGS. 2 and 3 that the piezoelectric members 42 and 44 are mounted not midway along the spring members 40, but are mounted so that the edges thereof are substantially flush with the center hub 28. As such, the spring members 40 are constrained to project initially radially outward from the center hub 28, being curved through a gentle curve by the piezoelectric members in accordance with the voltage applied thereto. The point of inflection in the spring members occurs between the outer edges of the piezoelectric members and the adjacent members of the segments 30 and 32, so that the outer ends of the spring members as fastened to the segments 30 and 32 are again constrained radially. Consequently, in a static sense, when a voltage is applied to the piezoelectric members a deflection of the piezoelectric members and associated spring members between the segments 30 and the the hub 28 cause a slight rotation of the hub 28, with the opposite deflection of the piezoelectric members and associated spring members coupled between the hub 28 and the segments 32 causing a rotation of the laser gyro of approximately twice the angle of rotation of the hub 28.

In the preferred embodiment, the spring rate of springs 40 and piezoelectric members 42 and 44, together with the polar moment of inertia of the laser gyro, are selected to provide an unconstrained natural frequency of the laser gyro on the dither motor of approximately 300 to 500 hz. Using 300 hz as an example, by applying a 300 hz A.C. voltage to the dither motor between the dither motor ground or mounting surface and lines 50, the laser gyro may be caused to vibrate at its natural frequency (obviously one could also sense the deflection of the dither motor and use that as a feedback signal so that the system would be self-oscillating at the natural frequency of the dither motor). Typically, a dither motor such as the motor described thus far with respect to FIGS. 1 through 3, or prior art dither motors, will have very little damping. With little damping the spring-mass system will exhibit a high Q of at least 100 and frequently as high as 300 or higher, so as to be very easily driven at the natural frequency of the suspension, but to have a very low response to any frequencies that are significantly different from the natural frequency of the suspension.

Figure 4:
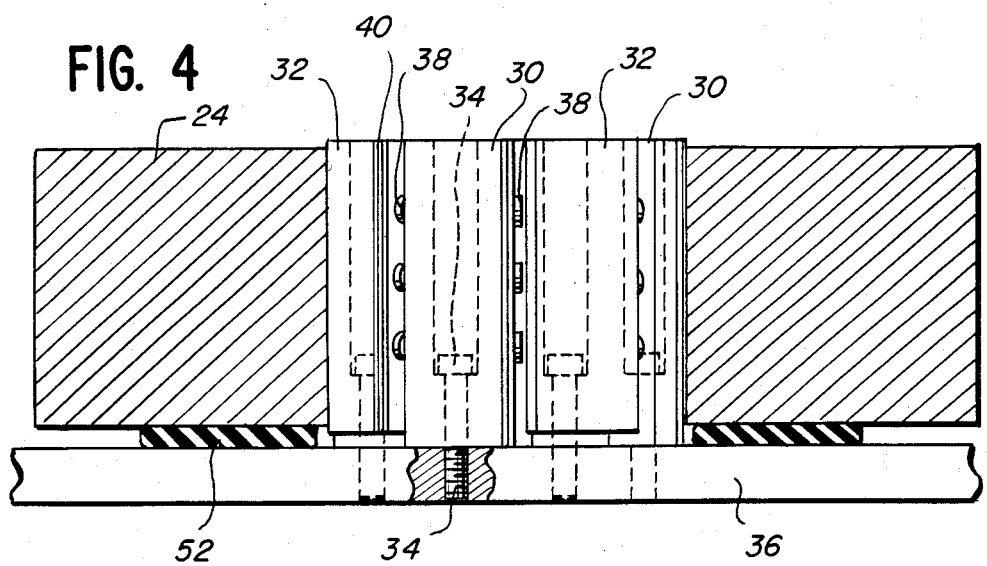
FIG. 4 is a side view of the laser gyro and dither motor of FIG. 1, the laser gyro being shown schematically in cross section, the figure illustrating the low Q mounting of the preferred embodiment of the invention.

The gyro-dither motor assembly of the present invention is specifically made to have a low Q so as to be responsive to a wide range of frequency components, the Q being on the order of 20 and more preferably on the order of 10 or less. The assembly is made low Q by damping the natural frequency thereof. This damping may be achieved in a number of ways. One way is to provide electrical damping. The piezoelectric elements are bilateral elements in that a voltage applied across the element causes a strain therein. Conversely, a strain mechanically induced in the element results in a voltage appearing across the element. A resistive load placed in parallel across the dither motor and coupled with a drive signal source having a substantial output impedance will result in the electro-mechanical system exhibiting a relatively low Q. Such resistive loads are illustrated schematically at 51, FIG. 3, with broken line connections across one pair of piezoelectric crystals. In the preferred embodiment as shown in FIG. 4, a mechanical damping system is used, specifically, by mounting the laser gyro 20 on a piece of elastomeric material 52 such as silicone rubber. The elastomeric material 52 is disposed between the body of the gyro and the mounting plate 36 which extends thereunder. The elastomeric material 52 and the amount of compression thereof due to the mounting of the gyro are proportioned to provide the desired low Q of the assembly.

The gyro-dither motor assembly having a low Q is responsive to a wide range of frequency components of a drive signal applied to the dither motor 22 on lines 50. The drive signal may be random in frequency only, or may be random in both frequency and amplitude (i.e., a random noise drive) so as to frequency modulate the dither imparted to the gyro causing the lock-in rate of the gyro to vary randomly as a function of the drive signal. Further, fixed frequency modulation of the dither motion may be employed for the low Q gyro-dither motor assembly as discussed below.

FIGS. 5, 6 and 7 illustrate the effects of the frequency modulated dither provided by the low Q gyro-dither motor assembly of the present invention having a sinusoidal drive signal with a random noise input or a drive signal which is merely random in frequency as contrasted with the dither provided by prior high Q gyro-dither motor assemblies having a sinusoidal drive signal or a sinusoidal drive signal with a random noise input.

It has been found that with a sinusoidal body dither for a high Q gyro-dither motor assembly, non-linearities in the output of the gyro exist when the input rate is a harmonic of the sinusoidal dither frequency, these non-linearities being illustrated at 54 for the gyro input-output curve shown in FIG. 5. As shown in FIG. 6, when the input rate of the gyro approaches a harmonic of the sinusoidal dither frequency, a positive scale factor error develops, the positive error peaking and reversing to a negative error which peaks and then diminishes as the input rate exceeds the harmonic. Further, as shown in FIG. 7 at 56, the integrated errors of the gyro output accumulate over time.

The addition of a random noise input to a sinusoidal dither for a high Q gyro-dither motor assembly results in only amplitude modulation of the dither motion, there being no frequency modulation because the assembly is responsive to only those noise frequency components of the drive signal which are very close to the natural frequency of the assembly. An example is to consider the effects of noise input components of 370 hz and 374.5 hz on a high Q assembly being sinusoidally dithered at its natural frequency of 375 hz. The 370 hz noise component will not have any substantial effect on the gyro dither as it is too far away from the natural frequency of the assembly. The 374.5 hz noise component, however, will beat against the 375 hz sine wave drive signal so that the gyro will be vibrated at 375 hz with an amplitude which is varying at a rate of 0.5 hz. The high Q gyro-dither motor assembly with a sine wave dither having a noise input basically dithers the gyro at the natural frequency of the assembly as amplitude modulated by the noise. The amplitude modulation of the dither due to the noise input somewhat reduces the width of the nonlinearities 54. However, because there is no frequency modulation of the dither motion, lock-in still occurs when the input rate is a harmonic of the sinusoidal dither frequency, the nonlinearities in the gyro output at the harmonics remaining. These nonlinearities cannot be averaged to zero as illustrated at 58 in FIG. 7 and still result in cumulative errors.

The low Q gyro-dither motor assembly of the present invention is responsive to a wide range of frequency components so that a sinusoidal drive with a random noise input effectively frequency modulates the dither motion imparted to the gyro. The frequency modulated dither motion causes the lock-in rate of the gyro to vary as a function of the random noise input, the lock-in rate moving back and forth in frequency space so that the nonlinearities in the gyro output are averaged to zero. The output of the gyro now appears to be linear as illustrated by the dotted line 60 in FIG. 5 with the errors or nonlinearities in the output having been eliminated.

The dither motor drive signal for the low Q gyro-dither motor assembly may be generated by any one of the various circuits illustrated in FIGS. 8–11. As shown in FIG. 8, the circuit may include a sine wave oscillator 62 the output of which is applied to a summing junction 64. The sine wave output of the oscillator 62 need not have a frequency which is equal to the natural frequency of the low Q gyro-dither motor assembly but is selected to have a nominal frequency and amplitude sufficient to impart a dither to the gyro. A signal generator 66 generates a signal having a random frequency. The generator 66 may also form a random noise generator so as to generate a signal which is random in both frequency and amplitude. The output of the generator 66 is applied through a band pass filter 68 to the summing junction 64 where it is combined with the output of the oscillator 62 to form the drive signal on line 50 applied to the dither motor 22. The low Q gyro-dither motor assembly is responsive to a wide range of frequency components of the drive signal applied on line 50, the drive signal frequency modulating the dither motion imparted to the gyro so as to randomly vary the lock-in rate of the gyro.

Because the gyro-dither motor assembly has a low Q it need not be driven at its natural frequency. Further, the dither imparted to the gyro of the low Q assembly is determined by the dither motor drive signal applied on line 50 substantially independent of other sources of vibration. These advantages enable a plurality of low Q gyro-dither motor assemblies forming an instrument cluster to be driven open loop by a common source. This is illustrated in FIG. 8 with the drive signal on line 50 being coupled to each of the dither motors 22, 22a and 22b of the low Q assemblies forming a cluster.

Each of the low Q assemblies associated with the motors 22, 22a and 22b may be positioned on a different orthogonal axis, such as the X, Y and Z axes, to measure rotation thereabout. In order to prevent coning errors from occurring, the drive signal on line 50 is shifted in frequency before being applied to the dither motors 22a and 22b so that each of the gyro-dither motor assemblies forming the instrument cluster is driven at a different frequency. The drive signal on line 50 is shifted 10 hz up in frequency by a frequency shifter 69, the output of which is applied to the dither motor 22a, the drive signal being shifted 10 hz down in frequency by a frequency shifter 70, the output of which is applied to the dither motor 22b. The structure of each of the dither motors 22, 22a and 22b and their associated gyros is the same as illustrated in FIG. 4, each forming a low Q assembly. Because the low Q gyro-dither motor assemblies employed to form the instrument cluster need not be driven at their natural frequency, assemblies having an identical structure and the same natural frequency may be employed for each axis even though the assemblies are driven at different frequencies. The low Q gyro-dither motor assemblies associated with each axis are completely interchangeable so that an inventory of only one type of low Q assembly need be maintained.

A second embodiment of the drive circuit is illustrated in FIG. 9 wherein the oscillator 62 and summing junction 64 have been eliminated. With prior art high Q gyro-dither motor assemblies, a sine wave oscillator is required since the noise frequency components within the very narrow response band of the high Q assembly cannot be relied upon to have a substantial amplitude, very large lock-in errors resulting in such instances if the relatively large sine wave drive is not present. However, with respect to the low Q gyro-dither motor assembly of the present invention, the relatively wide band width of response of the assembly makes such occurrences relatively unlikely, since it is very unlikely that all of the noise components throughout the response band of the assembly would momentarily have a very low amplitude. In order to eliminate this possibility, however, the circuit of FIG. 9 may be modified as shown in FIG. 10.

In FIG. 10, a pseudo-noise generator 72 is employed to generate the drive signal coupled by lines 50 to the low Q gyro-dither motor assemblies. The pseudo-noise generator may include a computer or microprocessor which is programmed according to well-known algorithms to provide an output having the statistics of pure randomness and appearing purely random over a short period of time, but which eventually repeats the same pseudo-random sequence. The entire time domain characteristics of the pseudo-random noise generator 72 can be selected so that any undesired momentary null conditions, possible in a truly random phenomenon, are eliminated.

The low Q gyro-dither motor assembly may also employ fixed frequency modulation of the dither motion as shown in FIG. 11. The drive circuit includes an oscillator 74 the output of which is combined by a summing junction 76 with the output of a periodic signal generator 78 to provide the drive signal coupled to the dither motors by lines 50. The frequency of the periodic signal output from the generator 78 is selected to be different than the frequency of the sine wave oscillator output so that the resulting drive signal frequency modulates the dither motion imparted to the gyro of the low Q gyrodither motor assembly.

We claim:

1. The combination comprising:
   a gyro having two counter-rotating beams of monochromatic light traveling along a closed loop path, the output of said gyro representing the frequency difference between said beams and a measure of rotation of said gyro;
   means coupled to said gyro for imparting a dither motion thereto, the gyro and dither means forming an assembly;
   means damping the gyro and dither means assembly to form a low Q assembly which is responsive to a wide range of frequency components; and means for frequency modulating the dither motion imparted to said gyro to eliminate errors in the output of the gyro caused by lock-in of the beams.

2. The combination of claim 1 wherein the Q of the assembly is on the order of 20 or less.

3. The combination of claim 1 wherein the Q of the assembly is on the order of 10 or less.

4. The combination of claim 1 wherein the gyro and dither means form an assembly, the natural frequency of which is damped so as to be responsive to said wide range of frequency components.

5. The combination of claim 1 wherein said modulating means includes:
means for generating a sine wave;
means for generating a periodic signal having a frequench different from the frequency of said sine wave; and
means for combining said sine wave and periodic signal to provide a drive signal, said dither means being responsive to said drive signal to impart the dither motion to the gyro.

6. The combination oomprising:
a gyro having two counter-rotating beams of monochormatic light traveling along a closed loop path, the output of said gyro representing the frequency difference between said beams and a measure of rotation of said gyro;
means coupled to said gyro for imparting a dither motion thereto, the gyro and dither means forming an assembly responsive to a wide range of frequency components; and
means for frequency modulating the dither motion imparted to said gyro to eliminate errors in the output of the gyro caused by lock-in of the beams, said modulating means including means for generating a drive signal having a randomly varying frequency, the dither means being responsive to said drive signal to impart the dither motion to said gyro.

7. The combination of claim 6 wherein the drive signal generated has a randomly varying amplitude.

8. The combination comprising:
a gryo having two counter-rotating beams of monochromatic light traveling along a closed loop path, the frequency difference between said beams being a measure of rotation of said gyro;
means for genrating a drive signal having frequency modulation;
means responsive to said drive signal and coupled to said gyro for imparting a dither motion thereto, the gyro and dither means forming an assembly; and
means damping the gyro and dither means assembly to form a low Q assembly which is responsive to a wide range of frequency components of said drive signal to vary the rate at which the two beams lock-in as a function of said drive.

9. The combination of claim 8 wherein said drive signal genertng means means generates a drive signal varying randomly in amplitude.

10. The combination of claim 8 wherein said generating means includes:
means for generating a sine wave;
means for generating a random noise signal; and
summing means for combining said random noise signal and said sine wave to provide said drive signal.

11. The combination of claim 8 wherein said generating means includes:
a random noise generator; and
a band pass filter coupled to the output of said random noise generator, the output of said filter forming the drive signal.

12. The combination of claim 8 wherein said generating means includes a pseudo-noise generator.

13. The combination of claim 8 in which the drive signal generating means includes a source of signal with a randomly varying frequency.

14. The combination of claim 8 in which said drive signal generating means includes means for generating a sine wave, means for generating a periodic signal having a frequency different from the frequency of said sine wave, and means for combining said sine wave and periodic signal to provide said drive signal.

15. The combination comprising:
a gryo having two counter-rotating beams of monochromatic light traveling along a closed loop path, the output of said gryo representing the frequency difference between said beams and a measure of rotation of said gyro;
means for generating a drive signal having a randomly varying frequency;
means responsive to said drive signal and coupled to said gyro for imparting a dither motion thereto; and
means for damping thenatural frequency of the gyrodither means to form a low Q assembly responsive to a wide range of frequency components of the drive signal, the dither motion being frequency modulated by said drive signal to eliminate errors in the gyro output caused by lock-in of the beams.

16. The combination of claim 15 wherein said dither means is secured to a mounting extending underneath the gyro and said damping meansincludes a piece of elastomeric material disposed between said gyro and said mounting.

17. The combination of claim 15 wherein said damping means includes a resistive load connected with said dither means.

18. The combination comprising:
a plurality of gyros each having two counter-rotating beams of monochromatic light traveling along a closed loop path, the output of each of said gyros being a measure of rotation of the respective gyro about its axis;
a plurality of dither motors, each coupled to one of said gyros for imparting a dither motion thereto, each gyro and dither motor forming an assembly, the assemblies forming a multiaxis instrument cluster;
means damping each gyro and dither means assembly so that each assembly has a low Q and is responsive to a wise range of frequency components; and
means for generating a drive signal to which each of said dither motors is responsive, said drive signal frequency modulating the dither motion imparted to each of said gyros to eliminate errors in the output of each gyro cuased by lock-in of the beams.

19. The combination of claim 18 including means shifting the frequency of the drive signal to one of the dither motors.

20. The combination of claim 19 in which there are three gyros and dither motor assemblies, one drive motor being responsive to the generated drive signal, and including means for shifting the drive signal frequency up for a second dither motor and means for shifting the drive signal frequency down for the third dither motor.

21. The combination of claim 20 wherein said generating means generates drive signals differ in frequency from each other by at least 10 hz.

22. The combination of claim 18 in which each of the gyro and dither motor assemblies is interchangeable.

23. The combination of claim 22 wherein each of said low Q gyro-dither motor assemblies has the same natural frequency.

24. The combination of claim 22 wherein each of said low Q gyro-dither motor assemblies has the same structure.

25. The combination comprising:
 a plurality of gyros each having two counter-rotating bemas of monochromatic light traveling along a closed loop path, the output of each of said gyros being a measure of rotation of the respective gyro about its axis;
 a plurality of dither motors, each coupled to one of said gyros for imparting a dither motion thereto, each gyro and diether motor forming an assembly responsive to a wide range of frequency components; and
 means for generating a drive signal varying randomly in frequency to which each of said dither motors is responsive, said drive signal frequency modulating the dither motion imparted to each of said gyros to eliminate errors in the outptut of each gyro caused by lock-in of the beams.

26. The combination of claim 25 wherein said generated drive signal varies randomly in amplitude.

* * * * *